T. C. Robinson,

Paper Cutter.

No. 4090. Reissued. Aug. 2 1870.

Witnesses.

E. W. Griffin

W. H. Fuller

Inventor.

T. C. Robinson

By his Attorney

Chas. F. Pansbury

N. PETERS, PHOTO-LITHOGRAPHER, WASHINGTON, D. C.

UNITED STATES PATENT OFFICE.

GEORGE H. SANBORN, OF NEW YORK, N. Y., ASSIGNEE OF THOMAS C. ROBINSON.

IMPROVEMENT IN PAPER-CUTTING MACHINES.

Specification forming part of Letters Patent No. 97,120, dated November 23, 1869; Reissue No. 4,090, dated August 2, 1870.

*To all whom it may concern:*

Be it known that THOMAS C. ROBINSON, of the city of Boston, in the State of Massachusetts, did invent certain new and useful Improvements in Book-Binders' Shears; and I do hereby declare the following to be a full and correct description of the same, reference being had to the accompanying drawing, in which—

Figure 1:
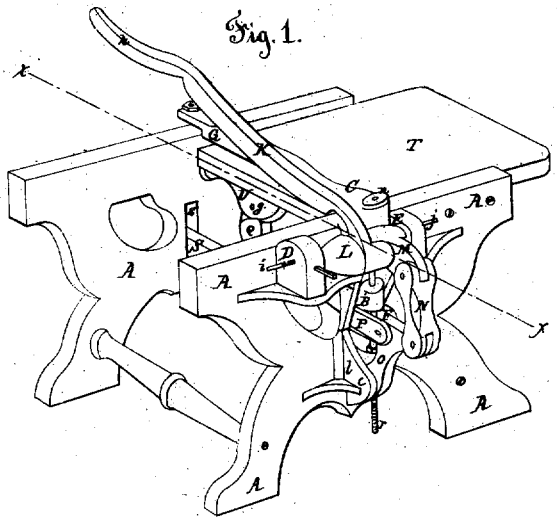
Figure 3:
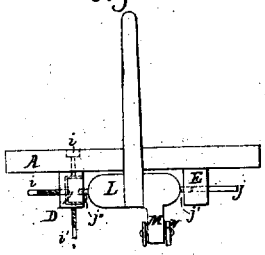
Figure 2:
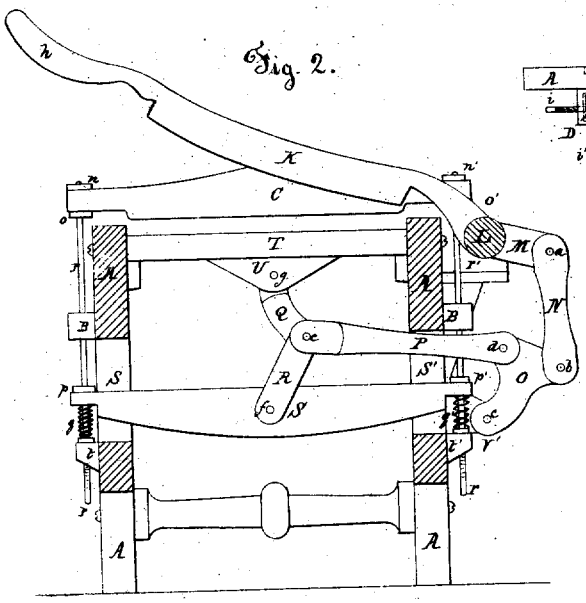

Figure 1 is a perspective view of the improved self-clamping paper-shears complete. Fig. 2 is a vertical section of the same on line *x x* of Fig. 1; and Fig. 3 is a top view of the shaft or knife-head, showing the mode in which it is hung and adjusted.

The same part is marked by the same letter wherever it occurs.

This invention relates to the table-shears used by book-binders, and operated by hand.

The nature of the invention consists in connecting with the movable knife, so as to be operated by it, a clamping device, that is brought down upon the paper with increasing pressure as the knife descends, and gradually relaxes its pressure as the knife ascends or is lifted.

It further consists in the peculiar manner of hanging and adjusting the knife-head, all as hereinafter more particularly set forth.

To enable others to make and use the improved machine, I will proceed to describe its construction and operation.

A stout frame, A, to which the operative parts are attached, is surmounted by a table, T, which supports the paper to be cut. A knife, K, having a handle, *h*, and a fulcrum at L, plays vertically against the front edge of the table T. The clamp C lies transversely across the table, its lower front edge being in the same plane with the front edge of the latter. Its office is to hold immovably the paper subjected to the action of the knife. It is operated by toggle mechanism, now to be described. The shaft L, which forms the head of the knife K, is hung on pivots to the brackets D E, attached to the outside of the frame. One of these pivots, *j'*, enters the bracket E, and is received by the end of an adjusting-screw, *j*, as shown in Fig. 3. The other pivot, *j''*, is received in a sliding journal-box, $D^2$, working in a recess in bracket D, and the two screws *i* and *j*, operating together, adjust the head L in the direction of its length, and thus regulate the proximity of the knife to the front edge of the table T. Angular adjustment is effected by screw $i^1$ entering the bracket D at right angles to screw *i*, and operating with screw $i^2$ to move the box $D^2$ in and out, so as slightly to alter the angle of the knife K to the front edge of the table T and give it the exact adjustment relatively thereto. From shaft L projects a short arm, M, pivoted at *a* to link N, which connects it at *b* with the bell-crank lever O. This lever is pivoted at *c* to lugs *l*, attached to the side of the frame, and at *d* to a link, P, united by pivot *e* to the toggle-arms Q R. The arm Q is pivoted at *g* to a bracket, U, depending from the bottom of table T. The arm R is pivoted at *f* to the bar S, which extends transversely across the machine, and works vertically in the slots *s s'*, in the side framing. The bar S is connected with the clamp C by the rods *r r'*. These rods are connected to the ends of the clamps C by the nuts *n n' o o'*. They pass down through brackets B B' and *t t'*, receiving the nuts *p p'* above the ends of bar S and nuts *v v'* below the spiral springs *q q'*, which rest against said nuts, and react upward against the ends of bar S, to throw up that bar and partly raise the knife K.

The operation is as follows: The paper to be cut is laid on the table T and placed in proper position beneath the clamp C, the knife and clamp being raised for that purpose. The knife is now driven downward to give the required cut. This movement brings the toggle-arms Q R into a line and forces down the bar S, which draws down the clamps C by means of rods *r r'*. When the clamp has descended as far as possible, the knife is driven to the end of its stroke, forcing down the bar S against the reaction of the springs *q q'*, which yield as the bar descends. The knife being now relieved of pressure, these springs react upward with sufficient force to raise the bar S and throw up the knife K to the position it occupies in Fig. 1. It is then lifted to raise the clamp C and release the paper, preparatory to a repetition of the operation.

Having thus fully described the invention, what I claim, and desire to secure by Letters Patent, is—

1. The combination of the knife K with the toggle mechanism for operating the clamp, substantially in the manner described.

2. The combination and arrangement of the bar S, springs $q$ $q'$, toggle mechanism, and knife K, substantially as described, for the purpose of throwing up the knife at the completion of its downward stroke, as stated.

3. The knife-head L, hung in the brackets D E by the pivots $j'$ $j''$, and adjusted longitudinally by the screws $i$ $j$ and laterally by the screws $i^1$ $i^2$, operating the sliding journal-box $D^2$, traversing in a recess in the bracket D, substantially in the manner and for the purpose set forth.

The above specification of the said invention signed and witnessed at New York city this 18th day of March, A. D. 1870.

GEO. H. SANBORN.

Witnesses:
J. L. GOSLING,
ABM. GOSLING.